United States Patent [19]

Holz et al.

[11] Patent Number: 4,687,331

[45] Date of Patent: Aug. 18, 1987

[54] RING LASER GYROSCOPE

[75] Inventors: Michael Holz, Newton Centre; Terry A. Dorschner, Newton, both of Mass.

[73] Assignee: Raytheon Company, Lexington, Mass.

[21] Appl. No.: 919,575

[22] Filed: Oct. 15, 1986

Related U.S. Application Data

[63] Continuation of Ser. No. 822,690, Jan. 22, 1986, abandoned, which is a continuation of Ser. No. 379,679, May 19, 1982, abandoned.

[51] Int. Cl.$^4$ .............................................. G01B 9/02
[52] U.S. Cl. ..................................... 356/350; 372/31; 372/32
[58] Field of Search ...................... 356/350; 372/31, 32

[56] References Cited

U.S. PATENT DOCUMENTS

| 3,170,122 | 2/1965 | Bennett, Jr. ............................ | 372/32 |
| 3,741,657 | 6/1973 | Andringa ............................ | 356/350 |
| 3,892,486 | 7/1975 | Ferrar ................................. | 356/350 |
| 3,973,851 | 8/1976 | Ferrar ................................. | 356/350 |
| 4,213,705 | 7/1980 | Sanders ............................... | 356/350 |
| 4,272,734 | 6/1981 | Jarrett et al. ........................ | 372/32 |
| 4,284,329 | 8/1981 | Smith et al. ......................... | 356/350 |
| 4,449,824 | 5/1984 | Matthews ............................ | 356/350 |

OTHER PUBLICATIONS

F. Aronowitz, Applied Optics, vol. 11, #2, Feb. 1972, p. 405.
M. O. Scully et al., "Novel Multi-oscillator Approach to the Problem of Locking in Two-Mode Ring-Laser Gyros", Optics Letters, vol. 3, No. 2, Aug. 1978, pp. 43-45.

Primary Examiner—Stephen C. Buczinski
Attorney, Agent, or Firm—Peter J. Devlin; Richard M. Sharkansky

[57] ABSTRACT

A laser gyroscope is described having a ring resonator adapted to support a plurality of resonant transverse electric and magnetic field modes TEM$_{qmn}$, wherein the longitudinal mode index q is a sequentially different integer for each mode and the transverse mode indices m and n are constant. The gain medium bandwidth is sufficient to simultaneously support at least two adjacent modes, such as TEM$_{qmn}$ and TEM$_{(q+1)mn}$ modes. Each mode is split into a set of four components having distinct frequencies, arranged in orthogonally polarized pairs, typically counter-propagating right-handed and left-handed circularly polarized. At least six components can resonate, arranged in three pairs of alternating polarization, two of the pairs from a first mode, for example TEM$_{qmn}$, and the third pair formed from the first two components from a second mode, for example TEM$_{(q+1)mn}$, with the frequency difference between counter-propagating components of such first pair synchronized to the frequency difference between components of such like polarized third pair, thus resulting in a common frequency difference for all similarly polarized pairs. A magnetic field is applied to the gain medium to equalize the frequency dispersion for each component pair. With such arrangement, pathlength control is not required and the mode components are free to drift in frequency as the pathlength changes. The circulating power is increased to reduce the laser gyro noise due to spontaneous emission.

7 Claims, 18 Drawing Figures

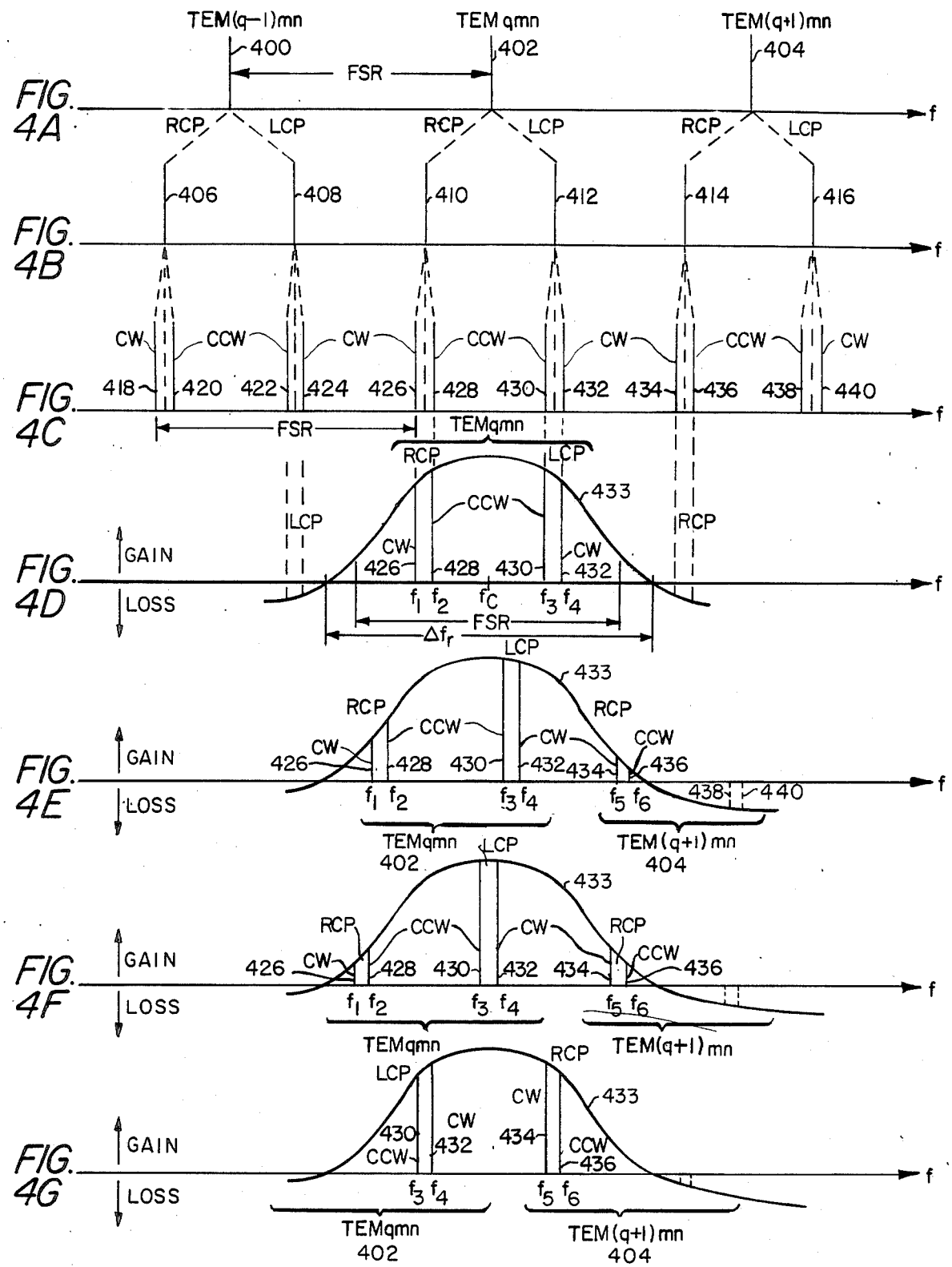

RING LASER GYROSCOPE

This is a continuation of U.S. Ser. No. 822,690 filed 1-22-86 and abandoned, which is a continuation of U.S. Ser. No. 379,679 filed 3-19-82 abandoned.

BACKGROUND OF THE INVENTION

Ring laser gyroscopes (referred as laser gyros for brevity) use an optical ring resonator which defines a unique sensitive axis about which inertial rotation is to be monitored. A gain medium within the resonator is used to generate and sustain one of the Gaussian, or so-called fundamental, modes of electromagnetic energy, the fundamental mode having components traveling around the resonator in clockwise and counterclockwise directions. Rotation of the resonator about its sensitive axis results in a frequency splitting between the clockwise and counterclockwise components. In order to avoid frequency locking that occurs at low rotation rates, laser gyros normally use a biasing scheme such that, for all expected rotation rates, the frequencies of the counter-propagating components are separated by an amount greater than the lock-in frequency range. In an optical biasing scheme typically used for four-frequency laser gyros, a direction-dependent (nonreciprocal) polarization rotation means, such as a Faraday rotator, and a direction-independent (reciprocal) polarization rotation means produce a resonator which sustains a fundamental mode having four components, each with a different frequency. One pair of frequency components has a first polarization sense, and another pair of frequency components has a second polarization sense orthogonal to the first, each one of the two pairs having the two frequency components propagating in opposite directions around the resonator. The rotation rate is measured by determining the difference in the frequencies of each of the pairs of oppositely traveling mode components to produce a pair of frequency difference signals. An output signal is then produced to provide a measure of rotation rate, such output signal being produced by taking the difference between the pair of frequency difference signals. Such laser gyro, is described in U.S. Pat. No. 3,741,657, issued June 26, 1973 to K. Andringa, assigned to the present assignee.

The frequencies of the resonating mode components are a function of the pathlength, and a change of pathlength, due to, for example, a temperature change, will cause the mode components to shift in frequency and thereby drift under the gain curve. Since the gain medium provides an index of refraction which is a function of frequency and since the frequency of the propagating waves, absent any pathlength control, changes, each of the two pairs of frequency difference signals changes differently independent of actual rotation rate. This effect is sometimes called gain medium induced frequency dispersion, and it gives rise to an apparent rotation rate which is, in part, a function of the pathlength. Then, even for moderate accuracy applications, the pathlength of the resonator for such prior laser gyros must be carefully controlled to produce a stable output signal.

SUMMARY OF THE INVENTION

This invention provides for a ring laser gyroscope supporting a plurality of resonant transverse electric and magnetic field $TEM_{qmn}$ modes, wherein the longitudinal mode index q is a sequentially different integer for each one of such plurality of modes and the transverse mode indices m and n are constant for each one of such plurality of modes. The gain provided is sufficient to simultaneously support a plurality of such modes, such as $TEM_{qmn}$ and $TEM_{(q+1)mn}$. In a preferred embodiment, means are also provided to split each one of such modes into a set of four components having distinct frequencies, each of such set of four components being arranged in two orthogonally polarized pairs, typically right-handed and left-handed circularly polarized pairs, each pair including components which propagate in opposite directions around said ring resonator. In such an embodiment, the gain of the medium is sufficient to support at least six components arranged in three pairs of alternating polarization, two of these pairs formed from the four components of a first one of such plurality of modes, for example $TEM_{qmn}$, and the third pair formed from the first two component from a second one of such plurality of modes, for example $TEM_{(q+1)mn}$. Further in such embodiment, the gain is such that the frequency difference between counter-propagating components of such first pair is synchronized to the frequency difference components of such like polarized third pair and more generally results in a common frequency difference for all similarly polarized pairs. Means are provided to generate a first frequency difference signal from counter-propagating components of pairs of a first polarization state and a second frequency difference signal from counter-propagating components of pairs of a second polarization state orthogonal to the first. An output signal is then generated by taking the difference between the first and second difference signals. Means are also provided to equalize the frequency dispersion of the gain medium.

In one embodiment, no pathlength control is used and the mode components are free to drift in frequency as the pathlength changes, one component pair of the next adjacent longitudinal mode of like polarization beginning to resonate before a corresponding component pair of the current mode stops resonating. This enables the manufacture of a low cost laser gyro, since no pathlength control circuitry is required and, additionally, the need for an expensive ultra-low expansion laser gyro block material is circumvented. In another embodiment, higher accuracy is achieved by using pathlength control and by increasing the circulating power to reduce the laser gyro noise due to spontaneous emission.

BRIEF DESCRIPTION OF THE DRAWINGS

Other and further objects and advantages of the invention will become apparent as the description thereof progresses, reference being had to the accompanying drawings in which like numbers refer to like elements and wherein:

FIGS. 4A–C illustrate the longitudinal resonant modes for an optical resonator;

FIGS. 4D–G illustrate the effect of a gain medium and pathlength change on the resonating modes in accordance to, the present invention;

DESCRIPTION OF THE PREFERRED EMBODIMENT

Referring simultaneously to the views of FIG. 1–3, the construction and operation of a laser gyroscope system in accordance with the teachings of the present invention will be described. Gyro block 102 forms the frame upon which the system is constructed.

Figure 1:
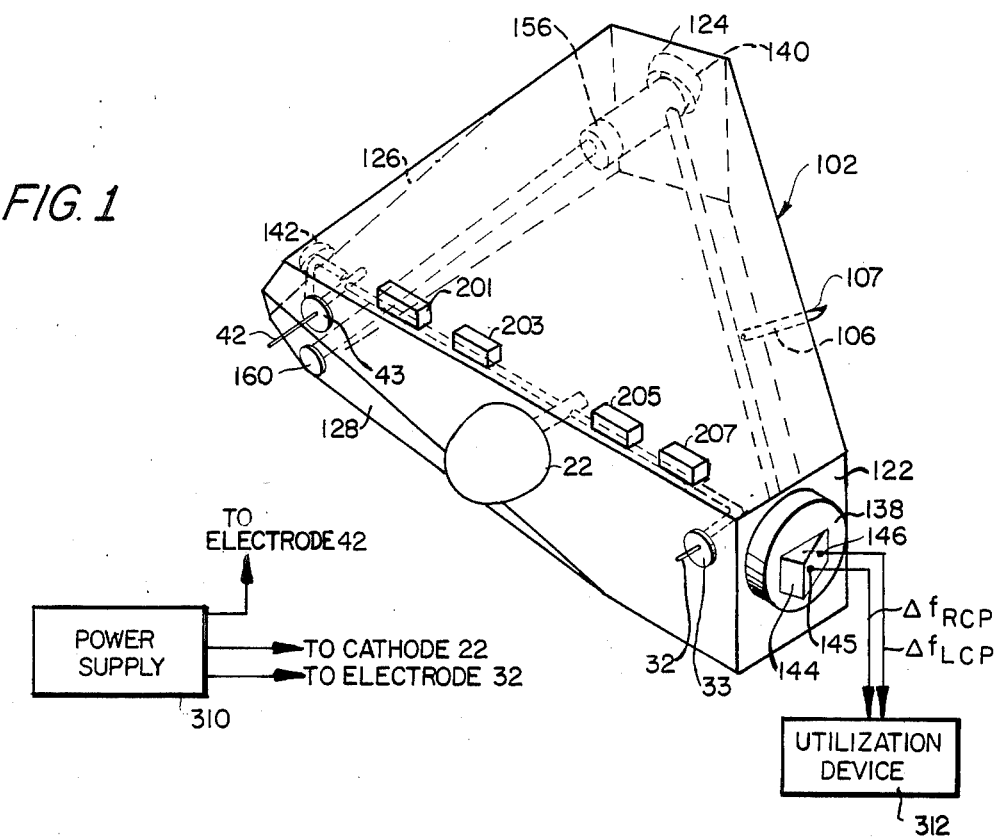
FIG. 1 shows a top isometric view taken from a first corner of a first embodiment of the laser gyro system according to the invention.
Figure 2:
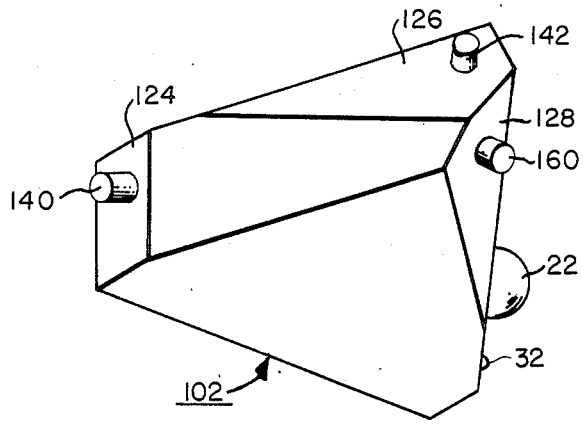
FIG. 2 is a lower isometric view taken from a second corner of the device shown in FIG. 1.
Figure 3:
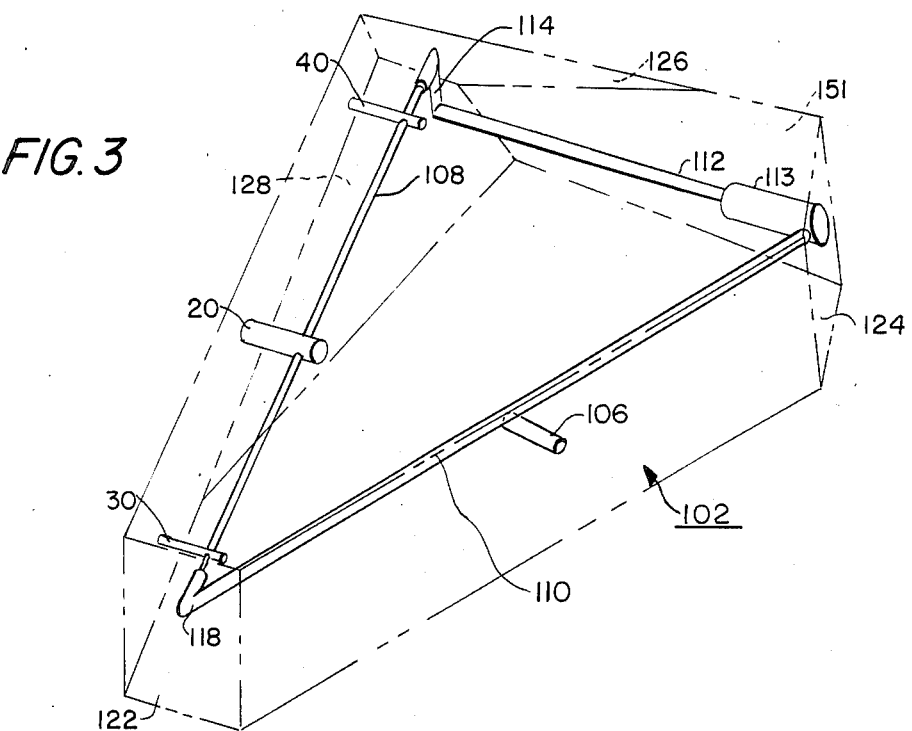
FIG. 3 is a different isometric view of the laser gyro block taken from the first corner of the device shown in FIG. 1 showing the internal construction and passages of the device therein.

Gyro block 102 has nine substantially planar faces as shown in the various views of FIGS. 1–3. As shown most clearly in the views of FIG. 3 which shows gyro block 102 without the other components of the system, passages 108, 110, 112 and 114 are provided between faces 122, 124, 126 and 128 of gyro block 102. The passages define a non-planar closed propogation path within laser gyro block 102.

Mirrors are provided upon faces 122, 124, 126 and 128 at the intersections of the passages with the faces. The faces are so oriented that flat mirrors on such faces will substantially reflect the centerline of one passage onto that of the other adjacent passage. Substrates 140, 142 and 160 having suitable reflecting surfaces comprise the mirrors positioned upon faces 124, 126 and 128 respectively. One of these mirrors should be slightly concave to insure that the beams are stable and confined essentially to the center of the passages. Also, a transparent mirror substrate 138 having partially transmitting dielectric mirror layers not shown on drawings, is provided upon face 122 to allow a portion of each beam traveling along a closed path within the gyro block 102 to be coupled into output optics 144. The structure of output optics 144 is disclosed in U.S. Pat. No. 4,141,651 issued Feb. 27, 1979 to I. W. Smith et al., and assigned to the present assignee.

Because passages 108, 110, 112 and 114 define a non-planar propagation path for the various beams within the system, each beam undergoes a reciprocal (direction-independent) image rotation and a concomitant polarization rotation as it passes around the closed path. A discussion of the non-planar path is found in U.S. Pat. No. 4,110,045, issued Aug. 29, 1978 to I. W. Smith et al., and assigned to the present assignee. The shape of the non-planar beam path determines the precise amount of rotation. The crystalline material which has been used in known laser gyros for the reciprocal polarization rotator has been completely eliminated from the beam propagation path, thereby eliminating all sources of error and drift associated with this element.

Ideally, only beams of substantially circular polarization exist in the preferred non-planar embodiment of the invention. With circularly polarized beams, errors arising from light scattering or coupling from one beam to another are minimized. This reduction occurs because light of one circular polarization state when backscattered is substantially of the opposite polarization handedness and therefore does not couple into and affect the counter-propagating beam. For other than circular polarization, this is not the case, because there is then always some component of the scattered beam which can couple to the counter-propagating beams.

In a preferred embodiment, the passages and reflecting mirrors are so arranged as to provide a substantially ninetydegree image rotation for the various beams resulting in a corresponding ninety-degree polarization rotation. Beams of right and left-handed circular polarization are rotated by this same amount, independent of their direction of propagation, thereby giving rise to equivalent phase shifts of opposite senses for the two polarization handedness; consequently a net phase shift is produced with the result that a frequency splitting between the beams of right-and left-handed circular polarization must occur in order for the beams to resonate within the optical cavity. This is shown in FIGS. 4A–B as the frequency splitting between the beams of left-handed circular polarization 408, 412 and 416 and the beams of right-handed circular polarization 406, 410 and 414. In the preferred embodiment, a ninety-degree rotation, corresponding to a 180 degree relative phase shift, is used although other phase shifts as well may be used depending upon the frequency separation desired.

Faraday rotator 156 is positioned within a larger diameter portion 113 of passage 112 adjacent face 124. Faraday rotator 156 comprises a thin slab of a suitable material and a magnet to provide the required magnetic field, as is known in the art. The details of the construction of a suitable Faraday rotator are described in U.S. Pat. No. 4,284,329, issued Aug. 18, 1981 to I. W. Smith et al. and assigned to the present assignee. Any solid material in the path of the counter-rotating beams will introduce scatter points which exhibit a sensitivity to thermal fluxes. This sensitivity may be due to the thermal expansion of the material or to a change in the optical path length due to the temperature dependence of the refractive index of the material. The effective temperature dependence of the optical path length, and therefore the thermally induced drift, has been found to be a function of the thickness of the solid material in the path of the beams. Thus, it is desirable to use as thin a slab as is compatible with the preferred Faraday bias levels. A thickness of 0.5 mm is acceptable. A commercially available material is Hoya Optics, Inc., material No. FR-5, which is a glass doped with paramagnetic material having an isotropic refractive index which in the presence of a magnetic field provides the Faraday rotation. Use of such a Faraday rotator avoids the depolarization of the resonant modes. Operating as close to circular polarization as possible reduces crosscoupling and therefore reduces thermally induced drifts due to any remaining scatter centers. This allows a gyro system of the present type to achieve stability levels corresponding to a variation in time of the indicated rotation rate of a fraction of a degree per hour.

Still referring to the views of FIGS. 1 and 3, electrodes for exciting the gaseous gain medium are disposed within passage 108. Preferably, center cathode electrode 22 is connected to the negative terminal of an external regulated power supply 310 while anode electrodes 32 and 42 are connected to the positive terminals. The aluminum cathode electrode is in the form of a short hollow cylinder capped by a hollow metal hemisphere at the end most distant from laser gyro block 102. It is attached by conventional means to the surface of gyro block 102 adjacent opening 20. Positive electrodes 32 and 42 are in the form of metal rods extending into electrode openings 30 and 40. With this configuration, the electron current flows outward toward electrodes 32 and 42 in two opposed directions. In this manner, because a beam traversing the passages in which the electrodes are located samples equal lengths of current flow of opposite direction, the effects of drag on the beam caused by interaction of the light with the flowing gaseous gain medium are substantially eliminated. However, because of manufacturing tolerances in the diameters of the passages and in the positions of the various electrodes, the effective distances between the negative and two positive electrodes in the two passages may not be precisely equal. To compensate for the inequality, electrodes 32 and 42 are connected to two independent positive terminals of supply 310, so that current flow between the positive electrodes and thereto adjacent negative electrode may be made unequal and thus compensate for the unbalanced drag effects.

The gaseous gain medium which fills passages 108, 110, 112 and 114 is supplied through gas fill opening 106 via pumpout tubulation 107 from an external gas source. A mixture $^3$He, $^{20}$Ne and $^{22}$Ne in the ratio of 14.0:0.54:0.46 is used. Once all the passages have been filled, tubulation 107 is pinched off to contain the gas for sealed-off operation. A gain medium pressure of 3 Torr and a 1.95 mA current was used in one embodiment in which bore 108 had a diameter of 0.077 inch. The actual gain mixture, pressure, bore size and current may be chosen to fulfill the requirement of the design, as is known in the art.

Referring now to FIGS. 4A-G, there are shown the various modes that illustrate the principles of operation of the present invention. FIG. 4A shows modes 400, 402 and 404, just three of the many longitudinal modes of a given transverse mode index set that are capable of resonating in a predetermined stationary isotropic resonator. A mode is a particular distribution of electromagnetic energy that satisfies the boundary conditions of the resonator. Any transverse electromagnetic mode (TEM) can be described by three indices q, m, and n, representing respectively, variations of the electromagnetic fields along 3 orthogonal coordinate directions, such as the z, x and y directions. The z-direction is here defined as the direction along the optic axis of the resonator and the x and y directions as two mutually orthogonal directions, each also orthogonal to the optic axis. For propagation in the z-direction, q is the longitudinal mode number representing the number of wavelengths that fit in the resonator path for a predetermined resonant frequency. Indices m and n are the transverse mode indices that represent the distribution of energy in the transverse plane for each longitudinal mode. The Gaussian, or fundamental, mode corresponds to transverse mode indices $m=n=0$. In the embodiment of FIG. 1, fundamental modes are used and modes other than fundamental longitudinal modes are suppressed by the aperturing effected by the mirrors and the bores between the mirrors, as is known in the art, thus obviating the need for a distinct aperturing element. For selecting longitudinal modes having predetermined transverse mode indices, a suitable aperture may be placed in any convenient location along the propagation path to enable only the predetermined modes to resonate.

Referring again to FIG. 4A, the frequency difference between any two adjacent longitudinal modes of constant transverse mode indices is called the free spectral range (FSR) and is given by c/L for ring resonators, where c is the speed of light in the resonator and L is the pathlength of the resonator. To put it another way, such longitudinal modes correspond to the harmonics of the lowest resonant frequency defined by c/L, with each succeeding harmonic having one additional wavelength $\lambda_o$ where $\lambda_o$ is defined by L. Thus, the nth harmonic has a wavelenth equal to $\lambda_o/(n+1)$. The resonator path may be twisted into a non-planar path to produce direction-independent image (and polarization) rotation, as discussed hereinabove. Each longitudinal mode will then split into a right-handed (RCP) and a left-handed (LCP) circularly polarized component. For example, in FIG. 4B, mode 400 is shown split into RCP mode component 406 and LCP mode component 408. If the image rotation is equal to 90°, the right-handed and left-handed circularly polarized mode components are split by one-half the free spectral range. If the image rotation is less-than 90°, the splitting is proportionally decreased. If a Faraday rotator is included in the non-planar resonator, a direction-dependent polarization rotation is further achieved. This causes each polarized component to further split into its two counter-propagating components, the amount of frequency separation being proportional to the amount of Faraday rotation provided (FIG. 4C). For example, in FIG. 4C RCP component 406 is shown split into a clockwise (cw) mode component 418 and a counterclockwise (ccw) mode component 420. The LCP mode component 408 is shown split into ccw LCP mode component 422 and cw LCP mode component 424. Similarly, the orthogonally polarized mode components 410 (RCP) and 412 (LCP), arising from the adjacent longitudinal mode 402, are each split into two counter-propagating mode components, respectively, 426-428, and 430-432. A similar result is obtained for next adjacent longitudinal mode 404 and all other longitudinal modes present. Thus, the direction-dependent (non-reciprocal) and direction-independent (reciprocal) polarization rotations are used to remove the four-fold frequency degeneracy of each resonating longitudinal mode and therefore produce four components from each longitudinal mode, each having a different resonant frequency, and each having a different polarization handedness and direction.

Referring now to FIGS. 4D-G, there is shown the effect of introducing a gain medium in the resonator just described. Only those mode components which have gain greater than the losses in the resonator are able to resonate. In FIG. 4D, four such components are shown having a symmetrical frequency distribution under the gain curve 433. Mode components 426, 428, 430 and 432 are the four components from one particular longitudinal mode, here TEM$_{qmm}$ 402, and represent the operation of a four-frequency laser gyro such as that of U.S. Pat. No. 4,110,045. They are shown having frequencies $f_1$ through $f_4$. As the pathlength varies, for example as a result of expansion or contraction of the gyro block with temperature, the absolute frequency of each mode and of each mode component shifts with respect to the center frequency $f_c$ of the gain curve. An expansion of a half wavelength results in a frequency shift of a half free spectral range. Those mode components which are shifted to frequencies for which the gain is less than the loss level (i.e. a normalized gain less than unity) no longer lase, and those mode components which are shifted to frequencies at which the gain is greater than the losses begin to lase. The frequency range $\Delta f_r$, FIGS. 4D–G, for which the gain is greater than losses, in other words, the bandwidth for which there is a net gain, is determined by the gain-to-loss ratio and the pathlength. In four-frequency laser gyros, such as that disclosed in U.S. Pat. No. 3,741,657, $\Delta f_r$ is less than the free spectral range (c/L) and thus one mode component pair is extinguished before another is shifted to frequencies for which lasing is possible so that at most only four frequencies resonate. Then, a pathlength change due to thermal effects may occur which causes one mode component pair to drop out resulting in two frequency operation with its concomitant bias stability problem.

In the gyro laser described in connection with FIG. 1 the net gain is provided over a frequency range greater than the free spectral range, as shown in FIG. 4D–G. This is accomplished by increasing the discharge current supplied by power supply 310. Other methods of increasing the gain may be used, as is known in the art. For instance, the discharge bore diameter and the pressure of the gain medium may be varied, the gas mix of the gain medium may be changed, the operating temperature may be varied or the loss of the resonation may be reduced. These different approaches may be used singly or in combination. As the pathlength changes, FIG. 4E shows the effect of the corresponding change in the resonant frequencies. A new frequency pair $f_5$ and $f_6$ representing RCP components 434 and 436 from adjacent longitudinal mode $TEM_{(q+1)mn}$ 404, now has sufficient gain to resonate, resulting in a six-frequency laser gyro. As the pathlength changes even further, FIG. 4F shows the mode components decreasing in frequency even further, as a result of further changes in pathlength, thus drifting in the drawing toward the left under the gain curve and resulting in a symmetrical six-frequency distribution. FIG. 4G shows a continued decrease in the resonant frequencies causing a new four-frequency distribution as mode components 426 and 428, having a frequency $f_1$ and $f_2$ outside $\Delta f_r$, become extinguished. The polarization of the remaining two mode pairs, that is LCP lower pair $f_3$ and $f_4$ and RCP higher pair $f_5$ and $f_6$ appears interchanged from that shown in FIG. 4D, that is RCP lower pair $f_1$ and $f_2$ and LCP higher pair $f_5$ and $f_6$. As the pathlength continues to change, the frequency distribution of the mode components continues to drift resulting in alternating four-frequency and six-frequency operation.

Referring now back to FIG. 1, there is shown output optics structure 144 supporting diodes 145 and 146. Output optics structure 144 separates the left-handed circularly polarized counter-propagating frequency pair(s) from the right-handed circularly polarized counter-propagating frequency pair(s), with frequencies of each polarization handedness being detected by a separate diode. For instance, diode 145 is used to provide a signal $\Delta f_{RCP}$ on a first output channel corresponding to the beat frequency of the RCP pairs, such as $(f_2-f_1)$ and $(f_6-f_5)$, while diode 146 is used to provide a signal $\Delta f_{LCP}$ on a second output channel corresponding to the beat frequency of the LCP pairs, such as $(f_4-f_3)$. At rest, the beat frequencies, or frequency differences, are equal and correspond to the Faraday bias. In the presence of rotation, one of the difference frequencies increases and the other decreases, the amount and sense of change being dependent on the direction and rate of rotation.

The two difference signals are coupled to utilization device 312 for further processing and display. The difference of the two difference frequencies is directly proportional to the rate of rotation of the gyro block 102. Utilization device 312 generates an output signal representing rotation rate by coupling the two difference signals to respective inputs of an up-down counter, as is well known in the art.

The scale factor of a laser gyro relates the input rotation rate to the measurable output frequency. This scale factor may be written as Scale Factor = Kq, where q is the longitudinal mode number and K is a proportionality factor that depends on the shape of the laser gyro. As the mode components drift under the gain curve in response to, say, uniform expansion of the block, the mode number q changes when new modes begin resonating. An expansion of the gyro by one free spectral range adds exactly one extra wavelength to the pathlength and gives rise to a relative scale factor change of $q/(q+1)$. For typical gyros, this corresponds to only one or two parts per million (ppm) of relative scale factor change, which is quite acceptable for most applications, and which can be compensated for higher accuracy applications. As is known in the art, there are also additional scale factor changes with mode positions under the gain curve due to the frequency dispersion of the gain medium which is not apparent from the usual simplified form of the scale factor. These variations are also acceptable for moderate accuracy applications.

The presence of a third mode component pair has been thought to be incompatible with gyro operations since the gain medium itself provides an index of refraction to the propagating waves which is a function of frequency. The waves will have a correspondingly different phase shift increment imparted thereto by the gain medium thereby providing an error in the measured rotation rate. More specifically, the presence of two mode component pairs of like polarization and slightly different frequency, for example referring to FIG. 4F pairs ($f_1$, $f_2$) and ($f_5$, $f_6$), gives rise to an amplitude modulation on the output channel corresponding to that polarization, since their respective frequency differences, for example the beat signal ($f_6-f_5$) generated from cw RCP component 434 and ccw RCP component 436 and beat signal ($f_2-f_1$), generated from cw RCP component 426 and ccw RCP component 428, also beat together, causing apparent variations in the rotation rates, and even loss of output signal.

It has been found that when resonating mode components of different longitudinal mode indices have gain greater than a predetermined threshold, one of the mode component pairs, for example, RCP mode components 426 and 428 in FIG. 4E having frequencies $f_1$ and $f_2$, perturbs the frequencies of the like polarized mode component pair, in this example, RCP mode components 434 and 436 having frequencies $f_5$ and $f_6$, via spatial modulation of the gain medium, with the result that one beat frequency, ($f_6-f_5$) is coherently synchronized, or phase locked, with the other beat frequency, ($f_2-f_1$). The oppositely polarized mode component pair $f_3$ and $f_4$ is not perturbed by the presence of the additional mode pair. Since all frequency differences from pairs of a given polarization are now identical, each of the two output channels produces a signal, for example, $f_{LCP}$ and $f_{RCP}$ respectively, that has no extraneous modulation, and the gyro operation with six frequencies is substantially the same as with four frequencies.

Figure 5A:
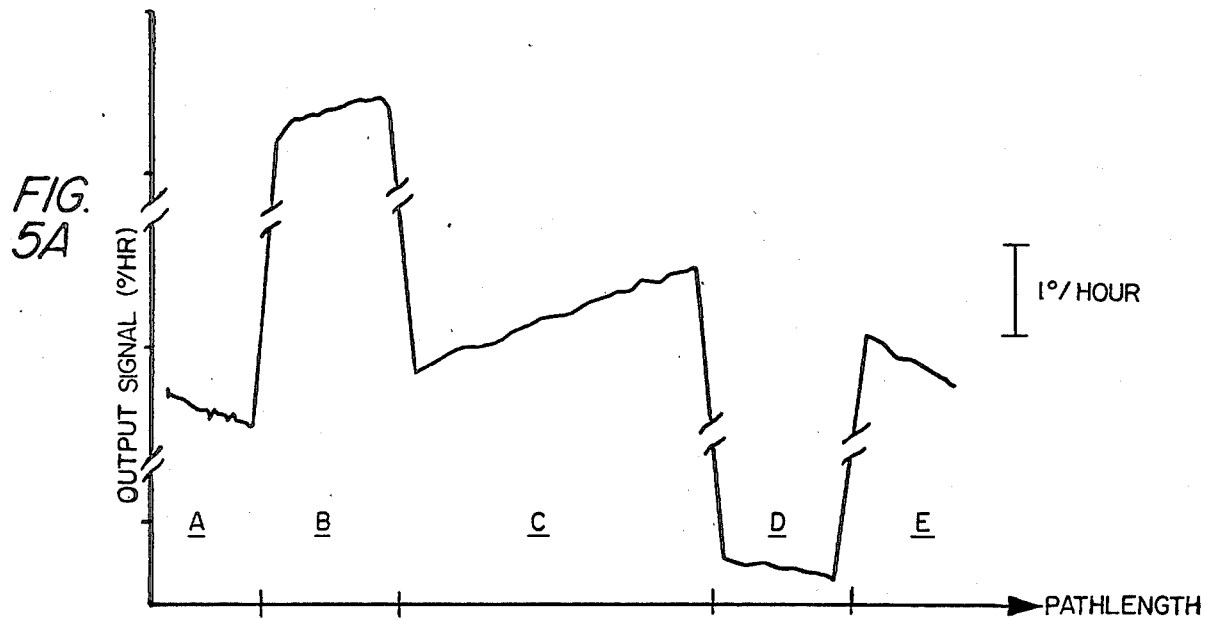
FIGS. 5A–C shows the variation in output signal at constant input rotation rate as a function of mode drift for a dispersion unequalized and equalized laser gyro of the present invention.
Figure 5B:
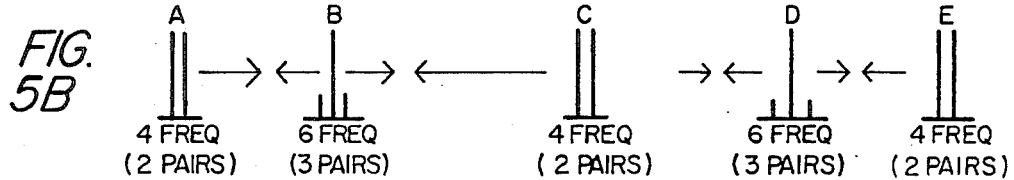

FIG. 5A shows the frequency of the output signal as a function of pathlength. The output signal is obtained by generating the difference between the two output channels, that is between the two beat signals $\Delta f_{RCP}$ and $\Delta f_{LCP}$, each of these two beat signals being produced, respectively, by mixing the mode components having like polarization handedness as discussed above. For a laser gyro, the output signal at rest sometimes is called output bias, since in many cases for a particular implementation of the multi-frequency laser gyro the output signal will indicate, at rest, an apparent rotation rate. Here, the dotted line represents earth rotation rate. The data of FIG. 5A and FIG. 5C were taken by using a piezoelectric stack to control the position of mirror 160 and by scanning the mirror to change the pathlength over one free spectral range with the application of a linear voltage ramp to the stack, thereby simulating the effects of changes in the optical length of the cavity due to, for instance, expansion of the gyro cavity or variations in the index of refraction of the gas contained in the cavity. FIG. 5B shows in schematic form, the mode component patterns which indicate the presence of either two pairs (four freouency operation), for instance, mode patterns A, C and E, or of three pairs (six frequency operation), mode patterns B and D, as a function of pathlength. Only the symmetric patterns are shown, denoting the center of the range for which operation in the represented state occurs. However, as the pathlength is changed, the modes vary uniformly from one state to the other. The transitions are denoted by the arrow heads. In each state, the output bias varies nearly linearly with pathlength, or mode position. There is also a large bias shift during each transition between the two states. These large shifts and the linear variation during each transition are due to the frequency dispersion of the gain medium, as will be described hereinbelow in more detail.

Figure 6A:
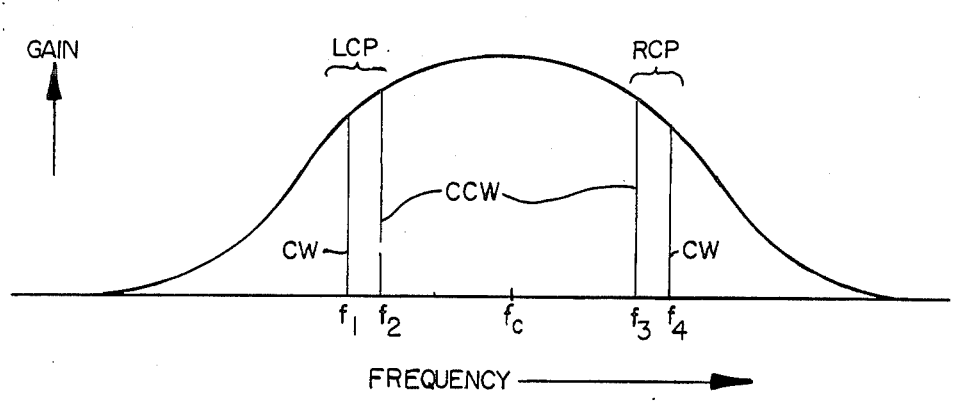
FIGS. 6A–C are graphs of the gain and resonating frequencies of the gaseous laser medium used with the laser gyro system of FIG. 1 illustrating the effects of frequency dispersion and its equalization.
Figure 6B:
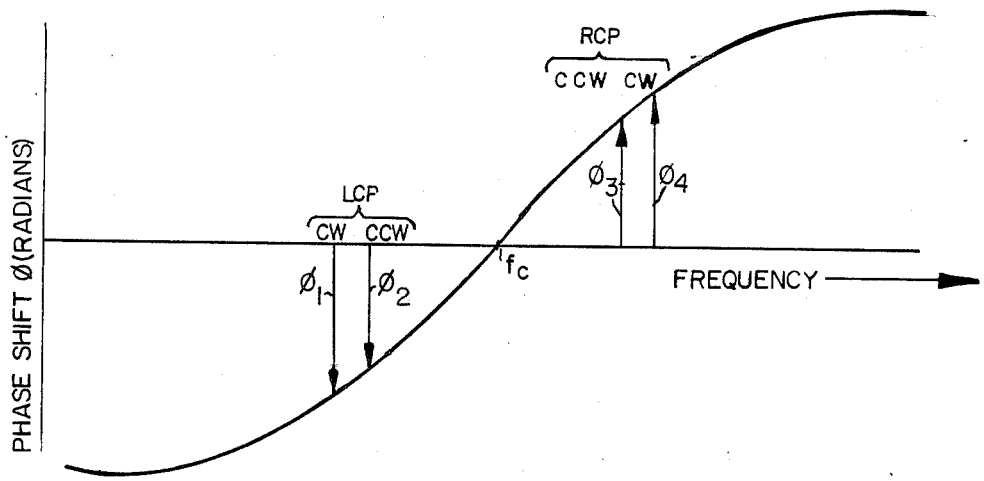
Figure 6C:
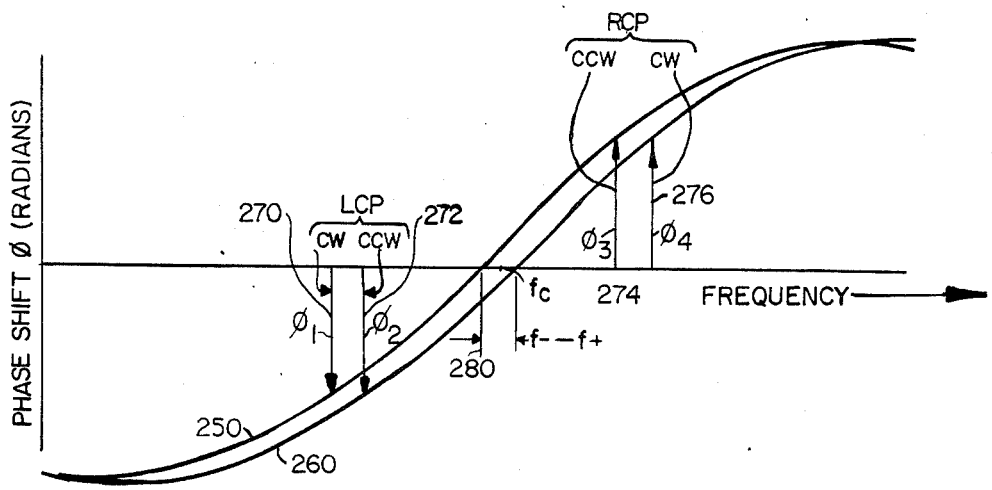

Gain medium frequency dispersion is due to the frequency dependent index of refraction associated with gain of the medium used. Referring now to FIGS. 6A–C, there is shown the gain line which for a He-Ne gain medium, is approximately Gaussian in shape due to Doppler broadening; the dispersion curve can be described as sigmoid. The dispersion curve expresses the amount of optical phase shift $\Phi$ that a wave of a particular frequency will experience due to the presence of the gain medium. As can be seen in FIG. 6B, frequencies below center frequency $f_c$ experience a phase shift opposite to that of frequencies above center frequency $f_c$ resulting in all modes being shifted toward line center. This is the mode pulling effect. Since the dispersion curve is nonlinear, the four modes of a differential gyro will be operating on points having different amounts of dispersion and correspondingly, referring to FIG. 6B, having different amounts of phase shift. $\Phi_1$ is the phase shift corresponding of $f_1$, $\Phi_2$ corresponds to $f_2$, $\Phi_3$ corresponds to $f_3$ and corresponds to $f_4$. If the difference ($\Phi_1-\Phi_2$) is different from the difference ($\Phi_4\Phi_3$), there will be a non-zero differential output at rest which depends on the shape of the dispersion curve, itself a function of many variables such as temperature, gain and pressure. As any one of these variables changes, this change will be reflected as a shift of the four modes across the dispersion curve which, due to its nonlinear nature, will result in a changing differential output. Thus, the gyro will have a drift in its output frequency which varies of a function of a variety of factors.

Figure 7:
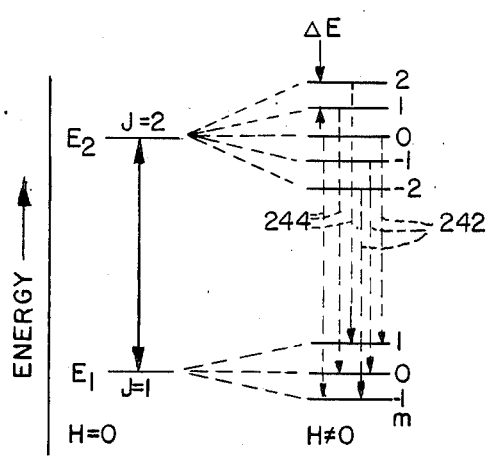
FIG. 7 is an energy level diagram showing the splitting of the energy levels of the gain medium in the presence of a magnetic field.

The gyro system of the present invention uses the Zeeman effect to eliminate the drift due to the gain medium dispersion. The Zeeman effect refers to the splitting of the spectral lines of the lasing gas into two or more components by application of a magnetic field. This frequency splitting results in a splitting of the gain curve and its corresponding dispersion curve. The physical mechanism is the quantum mechanical phenomenon in which a magnetic field, H, splits the atomic energy levels into several states which have different energies and which interact with waves of predetermined circular polarization states. This is illustrated in FIG. 7 where on the left side of the energy diagram there is shown a typical energy-state level in the presence of no magnetic field. In this case, the radiating frequency is $f_o=(E_2-E_1)/h$, where $E_2$ and $E_1$ are the two energy levels, and h is Planck's constant. The right side of the diagram shows how the energy levels are split in the presence of a magnetic field. Lines 242 show the energy level transitions corresponding to $\Delta m=+1$ that will give rise to one set of the radiating frequencies, such as the center frequency for split dispersion line 250 of FIG. 6C $f_+=f_0-g\beta H/h$. Lines 244 show the energy level transitions corresponding to $\Delta m=-1$ that give rise to the other set of radiating frequencies, such as the center frequency for split dispersion line 260 of FIG. 6C $f=f_0+g\beta H/h$, where g=Lande G-factor, $\beta$=Bohr magnetron, and h=Planck's constant. The four circulating modes have different values of the change $\Delta m$ of the magnetic quantum number m of the neon atom as follows:

| Mode No. | Direction | Polarization | Delta m |
|---|---|---|---|
| 1 | clockwise | LCP | +1 |
| 2 | counterclockwise | LCP | −1 |
| 3 | counterclockwise | RCP | +1 |
| 4 | clockwise | RCP | −1 |

The Zeeman effect is both polarization and direction dependent. The reason for this is that the sense of rotation of the electric field vector of the light wave as measured about the magnetic field interacts with the spin of the electrons whose energy levels are split by the field. Thus, one of the resulting dispersion lines interacts with a RCP wave that travels in a parallel direction to the direction of the magnetic field and a LCP wave which travels in an anti-parallel direction, that is, opposite the direction of the magnetic field, while the other dispersion line interacts with a RCP wave traveling in a sense anti-parallel to the magnetic field vector and an LCP wave traveling in a direction in the same direction as the magnetic field.

Since the values of $\Delta m$ correspond to different atomic transitions, these transitions are split by an amount equal to $2 g\beta H/h$ by the Zeeman effect. Referring now to FIG. 6C, there is shown a diagram of the split dispersion curves and the corresponding phase shifts of four mode components of a predetermined mode of the gyro. If the magnetic field H is such that the $\Delta m=+1$ line is lower in frequency than the $\Delta m=-1$ line by an amount 280 equal to $(f_2-f_1)$ then we will have line 270 and line 272 equal in height, that is, the amount of phase shift provided to $f_1$ and $f_2$ will be equal. Similarly, line 274 and line 276 will be at the same height, with the result that the frequencies $f_3$ and $f_4$ will have a similar amount of phase shift. It can then be seen that as the mode components drift across the dispersion curve or the dispersion curve changes, for example due to temperature, the dispersion of mode component $f_1$ will always be equal to that of mode component $f_2$ and that of mode component $f_3$ will similarly be equal to that of mode component $f_4$. Thus, as external conditions create small changes in the operating frequencies, the net difference in a differential output will remain the same. To remove the dispersion drift, the magnetic field for the Zeeman effect must satisfy the following expression: Faraday bias = $2g\beta H/h$ = (3.64 MHz/Gauss)H. This results in a gyro system capable of achieving a stability of the output bias of much less than one degree per hour.

Referring now to FIGS. 1 and 2 it can be seen that in a preferred low-cost embodiment, the magnetic field necessary for the Zeeman splitting of the dispersion curve is obtained by the use of permanent magnets 201, 203, 205 and 207 disclosed adjacent to discharge bore 108. Each magnet produces a magnetic field having a component along the axis of a respective discharge region within bore 108. The amount and polarity of magnetic field component is set to produce a Zeeman frequency splitting equal to the Faraday frequency splitting in the direction that removes the gain medium sensitivity of the waves as discussed hereinabove. Four separate magnets are used to provide a more uniform magnetic field. However, the uniformity of the magnetic field is not critical, and it suffices that the net, or average, magnetic field in the gain medium has the required value.

Figure 5C:
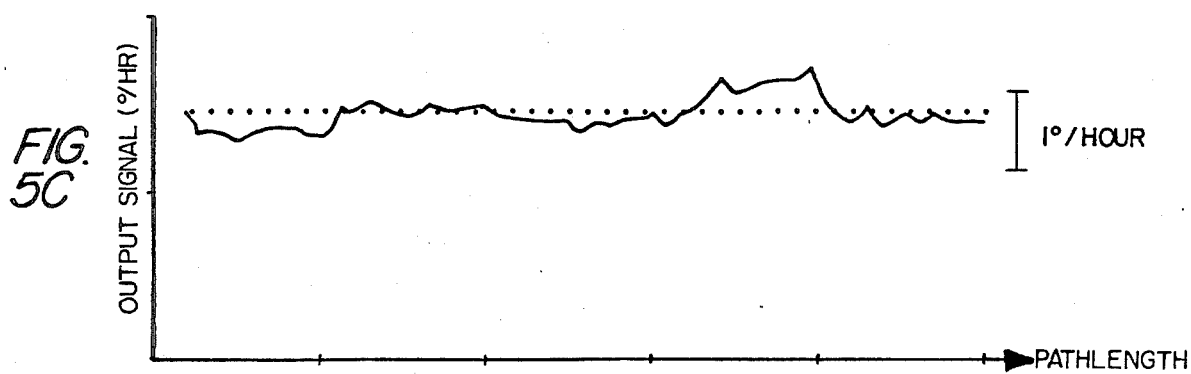

Referring now to FIGS. 5B–C, there is shown in FIG. 5C, the output bias as a function of pathlength for the dispersion equalized laser gyro. FIG. 5B shows the mode components pattern present as a function of pathlength as discussed before. As can be seen, the dispersion induced variation in output bias as well as the bias discontinuties during mode transitions are substantially eliminated.

One of the important advantages of the embodiment of the invention thus described and depicted in FIG. 1 is that it enables the manufacture of moderate accuracy laser gyros of much lower cost than heretofore possible. The fact that a stable gyro output is obtained even as the mode components drift in frequency allows the gyro to be operated without any pathlength control and additionally without the need of an expensive ultra-low expansion material for the gyro block. A temperature stable block and pathlength control are essential for all known prior laser gyros such as the gyro described in U.S. Pat. No. 4,284,329.

Figure 8:
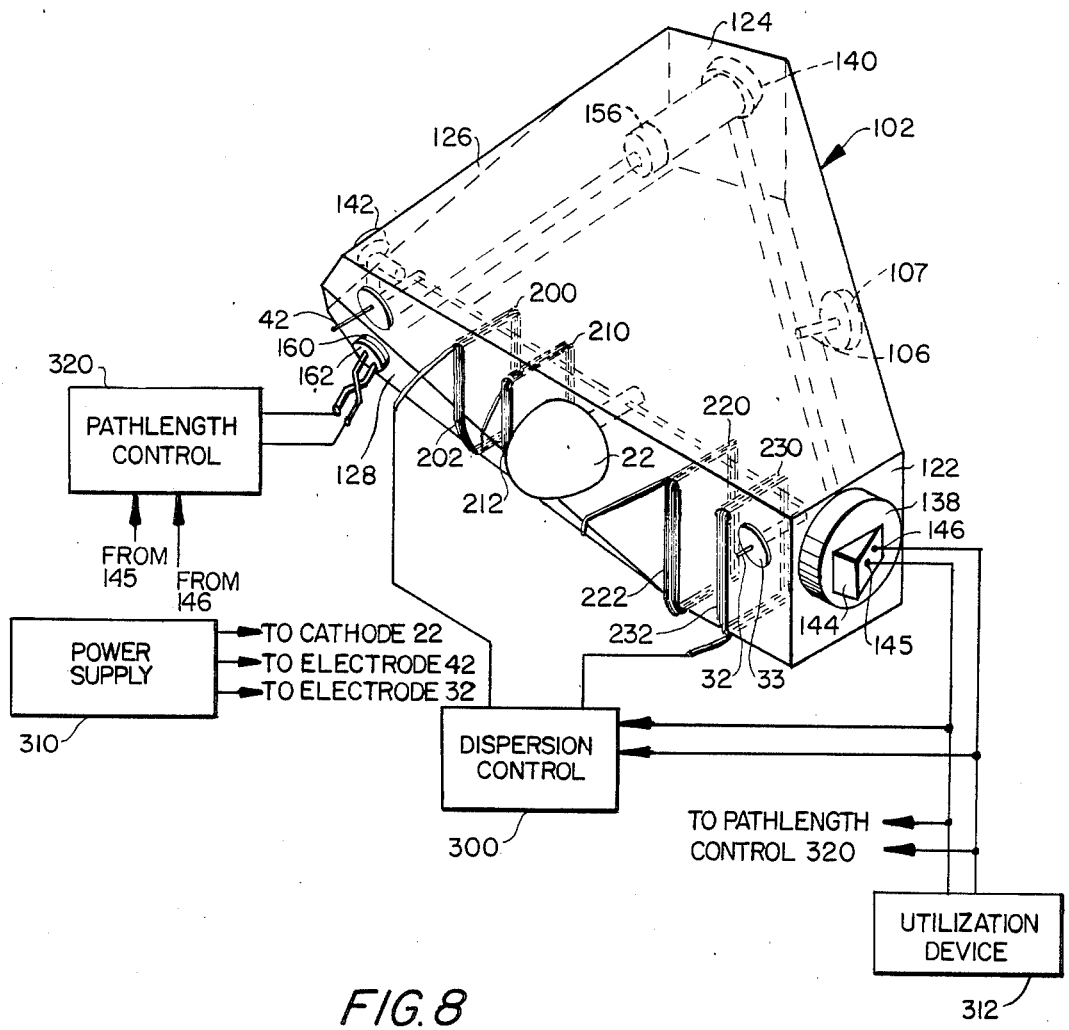
FIG. 8 shows a top isometric view of a laser gyro system according to a second embodiment of the invention.

Having shown that in a laser gyro the bandwidth of the gain can be increased and that the drift in the rotation rate signal from six (or more) frequency operation is reduced by synchronizing the beat frequencies of like polarized pairs, the present invention allows for the further reduction of noise in the rotation rate signal by increasing the circulating power of the laser gyro to decrease the noise levels due to spontaneous emission and by using a temperature stable gyro to decrease noise levels due to temperature variations. The temperature stability is provided by using a gyro block 102 which is preferably constructed with a material having a low thermal coefficient of expansion such as glass-ceramic material to minimize the effects of temperature change upon the laser gyroscope system. A preferred commercially available material is sold under the name of Cer-Vit ™ material C-101 by OwensIllinois Company; alternatively, Zerodur ™ by Schott Optical Glass, Inc., may be used. Additionally, referring now to FIG. 8, in system operation, it is desirable that the mode components be centered symmetrically about the peak of the gain curve. To this end, a piezoelectric transducer 162 placed in back of mirror 160 is provided to mechanically position the plane of mirror 160 with respect to face 128 so as to adjust the total pathlength within laser gyro cavity 102 to properly center the frequencies. Pathlength control 320 derives a signal for operating piezoelectric transducer 162 from detector diodes 145 and 146. These signals have amplitudes in proportion to the total amplitudes of the corresponding RCP channel and LCP channel signals. Control 320 generates the difference between these two amplitude related signals. The output difference signal is made to have a zero amplitude when the waves of the various frequencies are symmetrically centered upon the gain curve. The output difference signal is of one polarity when the waves are off center in one direction and the opposite polarity when the waves are off center in the other direction. The average amplitude signals can be formed by known circuitry, the output of which is coupled to the input leads of piezoelectric transducer 162.

The magnetic field necessary for Zeeman splitting of the dispersion curves is obtained in this high-precision embodiment by use of coils disposed around the passage that carry the lasing medium. Bores are drilled into gyro block 102 to provide passages 200, 210, 220 and 230 for the coils. Coils 202 and 212 are provided on one side of cathode 22 while coils 222 and 232 are provided on the other side of cathode 22 in order to provide Zeeman splitting throughout the active portion of the gyro path. Four sets of coils are used to provide a more uniform magnetic field to the lasing gas, however, any other arrangement that provides a longitudinal component of the magnetic field to the lasing gas can be used. Coils 202, 212, 222 and 232 are disposed around passage 108. Preferably, all four coils are controlled by a single source to provide a current of such magnitude and polarity to generate a magnetic field in the passages for creating the splitting of the dispersion curves equal in magnitude to the splitting in frequency of the Faraday bias provided by Faraday rotator 156 and in the direction that removes the sensitivity of the waves to the gain medium.

It is preferable to control the amount of magnetic field that is generated for the Zeeman splitting in relation to the amount of Faraday bias provided by the Faraday rotator. To this end, the outputs of diodes 145 and 146 are connected to dispersion control 300. Dispersion control 300 has conventional electronic circuitry to enable the forming of a signal representing the average of the two frequency differences and thus it measures the Faraday bias even under rotation. Further circuitry in dispersion control 300 provides current to coils 202, 212, 222 and 232 as a function of this Faraday bias signal to create and maintain a magnetic field in passage 108 for splitting the dispersion curve by an amount equal to the frequency splitting obtained by the Faraday bias. The magnetic field needed for dispersion equalization is given by H = Faraday bias/$2g\beta h$ = (Faraday bias in Hz)/$(3.64 \times 10^6)Oe$, and the current used to produce it depends proportionally on the number of turns of the coils, as is well known in the art.

It is found that the paramagnetic Faraday rotator of the present embodiment produces a Faraday bias having a characteristic that is inversely proportional to temperature. Through dispersion control 300, the magnetic field for the Zeeman splitting is generated to track the measured Faraday bias and thus the dispersion equalization is made independent of the temperature dependence of the Faraday bias. Control 300 generates a current whose amplitude is controlled as a function of a signal corresponding to the measured Faraday bias, for instance, the average of the frequencies of signals from photo detectors 145 and 146, through some proportionality constants accounting for both the relationship of the magnetic field, whose polarity depends on the sense of the coil windings, to the Faraday bias, and to the number of turns in the coil windings. A more detailed description of bias control electronics 300 is not needed, since the design of such control circuits is well known in the art.

Other modifications to the described embodiments will be apparent to persons skilled in the art without departing from the spirit and scope of this invention. For instance, even though a particular biasing technique using a non-planar path and a thin Faraday rotator has been described, the principles of this invention are equally applicable to any convenient bias technique which may be used. Additionally, even though six-frequency operation has been described, the invention is not to be limited thereby, and more than six-frequencies have also been used. Accordingly, it is intended that this invention be not limited except as defined by the appended claims.

What is claimed is:

1. The method of determining the rate of rotation being imparted to a ring laser gyro comprising the steps of:
   propagating electromagnetic waves having longitudinal modes of predetermined transverse indices in opposite directions in a ring resonator;
   providing a frequency split between said electromagnetic waves propagating in opposite directions of each longitudinal mode;
   producing a net gain to said electromagnetic waves throughout a frequency range greater than the frequency separation between two adjacent longitudianl modes;
   compensating for gain-induced frequency dispersion of said electromagnetic waves; and
   producing an output signal as a function of the frequency split between at least two of said counter-propagating waves and determining the rate of rotation of the resonator from such output signal.

2. The method of operating a resonator comprising the steps of:
   providing a ring resonator for the exclusive propagation of longitudinal modes of electromagnetic energy of constant transverse mode indics;
   removing the four-fold frequency degeneracy of each of said modes resulting in four mode components of different frequency arranged in two orthogonally polarized mode component pairs, each pair having counter-propagating mode components;
   providing a net gain to said modes throughout a predetermined frequency range, said range being sufficient to support in addition to the components of a first mode, at least one component pair of an adjacent mode as said mode components drift into said predetermined range;
   compensating for gain induced frequency dispersion of the pairs of counter-propagating mode components to allow frequency locking of the difference signal of one component pair of a first mode to the difference signal of a component pair of like polarization of an adjacent mode; and
   determining the rate of a rotation being imparted to the ring laser gyro, such rate of rotation determining step comprising the steps of:
   (i) measuring the frequency difference between counter-propagating mode components having a first one of the two orthogonal polarizations and producing a first signal representative of such frequency difference;
   (ii) measuring the frequency difference between counter-propagating mode components having a second one of the two orthogonal polarizations and producing a second signal representative of such frequency difference; and
   (iii) combining the first and second signals to produce an output signal representative of the rate of rotation of the resonator.

3. The method of determining the rate of a rotation being imparted to a ring laser gyro comprising the steps of:
   providing a resonator for the exclusive propagation of longitudinal modes of electromagnetic energy having predetermined and constant transverse mode indicies;
   splitting each mode into four basic components having different frequencies and arranged in two pairs of counter-propagating components, the two pairs having orthogonal polarization;
   providing a net gain for a frequency range sufficient to support the two component pairs of a first mode and one component pair of an adjacent mode;
   compensating for gain induced frequency dispersion of the pairs of counter-propagating mode components to frequency lock the frequency difference between components of one component pair in a first mode to the frequency difference between components of one similarly polarized component pair in a a second and adjacent mode as the latter components begin to resonate; and
   measuring the frequency differences between the pairs of resonating, counter-propagating components and determining the rate of rotation of the resonator from such measured frequency differences.

4. The method of claim 3 further comprising the step of:
   controlling the optical pathlength of said resonator.

5. The method of claim 3 wherein the dispersion compensating step comprises the step of providing a magnetic field to the net gain for splitting the frequency characteristics of the net gain into two components spaced in frequency by an amount substantially equal to the frequency split between the counter-propagating components of each pair of counter-propagating components.

6. The method of claim 5 wherein the magnetic field providing step further comprises the step of varying the magnetic field as a function of the average frequency split between said counter-propagating components.

7. The method of operating a ring laser gyro comprising the steps of:
   propagating longitudinal modes of electromagnetic energy having predetermined and constant transverse mode indicies in a resonator;
   splitting each mode into four basic components having different frequencies and arranged in two pairs of counter-propagating components, the two pairs having orthogonal polarization;

providing a net gain for a frequency range sufficient to allow the two component pairs of a first mode and one component pair of an adjacent mode to resonate;

compensating for gain-induced frequency dispersion of the pairs of counter-propagating mode components to provide phase locking between: the frequency difference between components of one component pair in a first mode; and the frequency difference between components of one similarly polarized component pair in a second and adjacent mode as the latter components begin to resonate; and determining the rate of a rotation being imparted to the resonator from the frequency differences between the pairs of resonating, counter-propagating components with the two component pairs of the first mode and one component pair of the second mode simultaneously resonating during a portion of the rotation rate determining step.

* * * * *